United States Patent [19]

Harrison et al.

[11] Patent Number: 6,091,709

[45] Date of Patent: Jul. 18, 2000

[54] QUALITY OF SERVICE MANAGEMENT FOR PACKET SWITCHED NETWORKS

[75] Inventors: Colin George Harrison, Brookfield, Conn.; Edith Helen Stern, Boca Raton, Fla.; Barry Edward Willner, Briarcliff Manor, N.Y.

[73] Assignee: International Business Machines Corporation, Armonk, N.Y.

[21] Appl. No.: 08/977,542

[22] Filed: Nov. 25, 1997

[51] Int. Cl.[7] .............................. H04J 3/14; H04L 12/56; H04L 12/66

[52] U.S. Cl. ......................... 370/235; 370/401; 370/411; 370/412

[58] Field of Search ................................... 370/229, 235, 370/231, 230, 237, 238, 252, 401, 411, 412, 428, 429, 455

[56] References Cited

U.S. PATENT DOCUMENTS

| | | | |
|---|---|---|---|
| 5,235,595 | 8/1993 | O'Dowd | 370/94.1 |
| 5,828,653 | 11/1998 | Goss | 370/230 |
| 5,835,484 | 11/1998 | Yamato et al. | 370/230 |
| 5,901,140 | 5/1999 | Van As et al. | 370/236 |

OTHER PUBLICATIONS

*Multimedia on the Internet*; Pallavi Shah, Sun Mircosystems; 20th International Compsac 1996, Computer Software & Applications Conference Seoul, Korea, 1996 p. 150.

Software for a Real Time System for Monitoring; G. Manco, G. Mangia, M. Franchin, M. Paladin; AICA Annual Conference Proceedings Bari Italy, 1990, pp. 831–845.

Management Informaiton Base for the Real–time Transport Protocol, Zhu, Z. et al., Symposium on Communications, 18th, Kingston, Ontario, Jun. 2–6, 1996 Proceedings, pp. 293–296.

*Primary Examiner*—Chi H. Pham
*Assistant Examiner*—Kim C. Nguyen
*Attorney, Agent, or Firm*—Robert Lieber; Richard A. Tomlin

[57] ABSTRACT

A packet router for a data packet transmission network, wherein routers offer priority services of the type required for isochronous handling of data representing real-time voice, includes a Quality of Service (QoS) management system for ensuring that guarantees associated with such priority service can be met with a high degree of certainty. This management system provides prioritized queues including a highest priority queue supporting reservations for the priority service suited to isochronous handling. The highest priority queue and other queues are closely monitored by a QoS manager element for states of near congestion and critical congestion. While neither state exists, filler packet flows are promoted from lower priority queues to the highest priority queue, in order to keep the latter queue optimally utilized. If all lower priority queues are empty at such times, dummy packets are inserted as filler flows. Dummy packets have a form causing routers and other stations receiving them to immediately discard them. The volume of dummy traffic allowed for each queue of the system is a predetermined fraction of the queue's estimated peak traffic load, and that volume is displaceable to allow forwarding of additional traffic through the queue when conditions require it. While a state of near congestion exists, the QoS manager demotes filler flow units from the highest priority queues to lower priority queues, in order to lessen the potential forwarding delays presented to real traffic occupying the highest priority queue. When a state of critical congestion exists in the highest priority queue, admission of new incoming traffic flows to that queue is suspended and forwarding of filler flows from that queue out to the network is also suspended.

11 Claims, 4 Drawing Sheets

Each supports priority classes 0 - n (n > 1)

QUALITY OF SERVICE MANAGEMENT FOR PACKET SWITCHED NETWORKS

BACKGROUND OF THE INVENTION

This invention concerns a problem specific to packet transmission networks such as the Internet. Since such networks are inherently asynchronous, routing of packets is subject to delays of indefinite duration. Hence, data requiring isochronous handling (e.g. video or voice data contained in interactive communications) may be subject to undesired distortions on arrival at destinations.

In these networks, packets are transferred from sources to network routers (transmission distribution hubs) and via the latter to respective destinations. At routers, packets are placed on queues associated with a transmission interface to the network, or more loosely an output port. After some delay (usually indefinite or indeterminate), packets are forwarded to next stations (other routers or end destinations). Such delay may be due to problems on the transmission link, traffic congestion at next stations, or other causes. Hence, as noted, data needing isochronous handling requires additional support.

In respect to the Internet, two sets of standards have been proposed for addressing problems associated with delivery of isochronous real-time services. These are:

1. Resource Reservation Protocol (RSVP), a router protocol currently an Internet draft, allowing a designated packet receiving station to send a request for priority service back along the route of the transmitted packets. At each router which is RSVP enabled, the request makes a reservation for a certain class of priority in forwarding packets; typically, a choice of a class of priority associated with one of the following quality of service (QoS) levels:
   a. Best effort
   b. Controlled delay (upper bound on permitted forwarding delay)
   c. Predictive service (guaranteed service level for some fraction of traffic in the class)
   d. Guaranteed service (predefined average bit rates)
2. Real Time Protocol (RTP) and Real Time Control Protocol (RTCP), defining methods of transmitting packets of sampled audio, video or other real-time data using a Universal Datagram Protocol (UDP). RTP defines a packet header, containing, among other things, information representing a time-stamp for the respective packet that is intended to enable a receiving station to play out the samples with correct timing and sequence. RTCP comprises sets of messages that can be exchanged between sending and receiving stations to establish and control a flow of real-time information. Although RSVP and RTP need not be used together it is likely they will be.

A problem we have recognized is that although these protocols are likely to improve handling of real-time traffic, they do not define mechanisms for guaranteeing with any degree of certainty that a network can in fact meet user requests for prioritized services. For example, when an RSVP-enabled network becomes congested, it is reasonable to expect that users transmitting real-time data would tend to request increased priority for their packets, and this in turn could tend to reduce capacities available to new traffic and lead to further increases in congestion. Our invention is directed to solving this problem; i.e. to providing a mechanism for enabling such routers to meet guarantees associated with priority classed services with a high degree of certainty, and thereby effectively ensuring that traffic subscribed to a special class of service associated with isochronous handling will receive adequate handling.

Routers and their interfaces can become congested if they are unable to forward packets as fast as they are being received. The above-referenced protocol and other protocols allow routers to discard packets in such circumstances. Normally, this is very disruptive as the destination host will detect that packets have been lost in transmission and start a transport layer protocol to request re-transmission of the missing packets, which packets would have to be re-ordered relative to previously received packets before they are passed up to the higher protocol layers. It is necessary to recover missing packets because data containing the missing data could in some instances be worthless or unuseful without it; for example, if data in missing packets is part of a data set that represents the binary image of a program or contents of a database, the set minus the missing data may not have any usefulness.

However, the type of traffic for which RSVP and RTP were created—typically, samples of real-time audio or video—is tolerant of lost packets. For such traffic, loss of packets leads at worst to momentary glitches in playout of the audio or video. The perceptual degradation associated with such glitches is often acceptable provided only a small fraction of packets are lost. In many cases, codecs which recreate uncompressed streams of data representing audio or video functions can fill in missing data. Thus, it is acceptable to routinely discard packets from this type of traffic as a management strategy.

SUMMARY OF THE INVENTION

Our invention is a Quality of Service (QoS) control mechanism—for use e.g. in network routers—that enables network service providers to offer priority classes of service with special guarantees to real-time users (based on usage fees imposed on the users) and to meet respective guarantees with a high degree of certainty. This mechanism—which preferably would be implemented as software applications executable on general purpose computers, but also could be implemented in special purpose hardware—is designed specifically to ensure with a high degree of certainty that prioritized data will be delivered with isochronous timing; the degree of certainty increasing progressively for progressively higher levels of priority.

This mechanism has as main components in each enabled router: (a) an array of prioritized packet forwarding queues; (b) a QoS manager; (c) a packet prioritizing element; and (d) a prioritized packet forwarding element.

The QoS manager acts in response to requests routed through the network to assign incoming traffic to prioritized service levels associated with prioritized forwarding queues in the router, to monitor traffic congestion conditions locally in the forwarding queues, and to restrict admission of new flows into the queues when necessary to counteract congestion. Monitoring of congestion in the queues is achieved by having incoming packet flows time stamped as they enter the queues, sampling time stamps at appropriate intervals, and calculating average forwarding delays by subtracting sampled time stamps from a representation of current time and averaging the results over time.

The packet prioritizing element steers incoming packets to forwarding queues appropriate to their reserved classes of service (to a lowest priority queue if the packets do not have service reservations). If priority queues can accept additional traffic because they are being under-utilized, traffic in lower priority queues is transferred to the under-utilized queues. This effective promotion of lower priority traffic is maintained until all queues are operating just below their thresholds of congestion. The thresholds of congestion are associated with operating states in which queues are not actually congested but could become so with moderate increases in their loads.

The queue monitoring process conducted by the QoS is able to distinguish when queues are operating below and above their thresholds of congestion, as well as when queues are in a critical state of congestion well above that threshold.

The packet forwarding element is responsible for transferring traffic from the prioritized forwarding queues out to the network, and via the latter to next routers/stations. In this process packets are transferred preferentially from the highest priority non-empty queue, and dummy packets allocated to service levels associated with individual queues is inserted into the outbound traffic when forwarding rates from respective queues allows it; i.e. while respective queues are operating below their thresholds of congestion. Dummy packets have a form requiring network stations and routers receiving them to immediately discard them.

The dummy packets, and other forms of filler traffic explained herein, are used presently as a type of "discardable ballast" enabling the present QoS manager to precisely control congestion in the queues, even when causes of congestion are external to the respective router. The QoS manager allows for an initial or nominal rate of flow of dummy traffic relative to each queue (e.g. 10% of the capacity allocated to the service class corresponding to the respective queue's priority). Dummy traffic for each queue is discardable as real traffic occupying the queue increases to a level requiring such displacement.

Filler traffic other than dummy traffic is promotable up to a priority queue, from a queue of lower priority, while the queue is operating below its threshold of congestion. As noted above, the QoS manager is able to detect when a queue is operating in a critical state of congestion well above its threshold of congestion. While that state persists, forwarding of promoted filler traffic in the affected queue is suspended, thus allowing only unpromoted real traffic in the queue to be forwarded out to the network. At such times, admission of new incoming traffic that would go directly into the congested queue is also suspended. Such actions are expected to quickly reduce congestion (since some of the transmission associated with previously admitted traffic will be concluding), so that reductions in new traffic admission are expected to occur infrequently and last for very short intervals of time during station operations.

It is characteristic of many systems employing prioritized queues that as the traffic load on a queue increases from zero, the forwarding delay in the queue increases gradually and linearly at first, but beyond some threshold the delay increases very rapidly and non-linearly leading to congestion of the queue. The graph of forwarding delay versus queue load associated with this characteristic behavior is often called a "hockey-stick" curve because of its shape.

In a large network the volume of traffic at which this forwarding delay begins increasing non-linearly is difficult to predict and may vary depending on several factors in both the router and in the network in which the router is operating. In a lightly loaded network, the forwarding delay in a router is often very small, a few milliseconds, but can rise quickly to hundreds of milliseconds in congested conditions. While the volume of traffic which can cause congestion is not well defined, the bend between the linear and non-linear parts of the hockey stick curve is easily discerned, and a point in that bend representing the upper bound of linear increase in average forwarding delay is reasonably determinable. In this invention this upper bound representation is used to represent a threshold of congestion. When a queue is operating below that threshold in the present system it is deemed capable of handling both new incoming traffic and promoted filler traffic.

As noted earlier, the present QoS mechanism monitors the average forwarding delay in the queues, and determines when queues are operating above and below their threshold of congestion, as well as when queues are in a state of potentially critical congestion. While queues having other than a lowest priority are are operating below their threshold of congestion, this mechanism transfers/promotes filler traffic into the respective queue from lower priority queues. While queues are operating above their threshold of congestion but not in the above-mentioned state of potentially critical congestion, promoted filler traffic is moved/demoted to lower priority queues. When queues reach the potentially critical state, this mechanism acts to suspend admission of new incoming traffic into the queue and also suspends forwarding of filler traffic from the queue out to the network, allowing only traffic occupying the queue as other than filler traffic to be forwarded (i.e. allowing only traffic having a service reservation class corresponding to or greater than the queue's priority level to be forwarded).

These actions serve to regulate the flow through the priority queues so that traffic associated with a corresponding level of service is subject to being forwarded with less forwarding delays than any other traffic in the respective queue or in any lower priority queue. Thus, promoted filler traffic and dummy traffic associated with each priority queue serves as a kind of discardable ballast that keeps the queue operating efficiently when it is uncongested and to minimize forwarding delays encountered by traffic having service reservations entitling them to at least the priority of the respective queue.

This usage is described further in the detailed description below, and charts/graphs used to support that description should clarify many of the functions alluded to above.Thus, these charts and the following description should clarify how the regulating effects suggested above are actually achieved. They should show also that addition of filler traffic to non-congested queues leads to a small but acceptable forwarding delay, which is fully compensated for by the ballast effect associated with use of the filler traffic to counteract states of congestion. Thus, it will be seen that under less than extreme conditons of congestion, the router is able to comfortably accept reservations for more incoming priority traffic flow without detriment to the flow of existing real traffic; notwithstanding the promotions of filler traffic into the queues, and that only under more critical conditionst will the router be required to suspend admission of new incoming traffic to its queues.

As noted above, dummy filler traffic for each class of priority service supported at a station may be set initially to a predetermined fraction of the station's estimated capacity for that class; e.g. 10%. The estimate of forwarding capacity and the fraction thereof allocated to dummy filler traffic need not be exact since they are improved iteratively in the course of operating the station. Since real-time traffic (traffic requiring guaranteed isochronous handling) is expected to use a small fraction of a router's capacity, the presently contemplated interspersal of dummy filler traffic in the priority queues should not seriously reduce the capacity available to real traffic.

Structures and operations of elements of the subject mechanism, and other features, advantages and benefits of the invention, will be more fully understood by considering the following detailed description and claims.

DETAILED DESCRIPTION

1. Background

Figure 1:
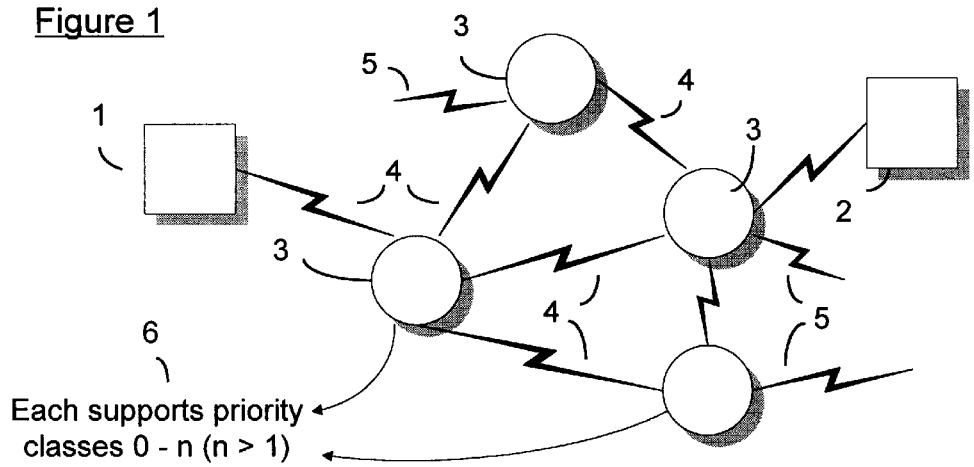
FIG. 1 is a schematic of a network designed to use the present invention.

FIG. 1 shows a packet routing network designed to use the subject invention. End stations 1, 2 represent sources and destinations of real (non-ummy) traffic. Intermediate stations 3 represent packet routers or distribution hubs, each containing a QoS mechanism constructed in accordance with the present invention. Communication links between stations are suggested at 4 and 5; 4 showing links between pairs of illustrated stations, and 5 suggesting links between illustrated and unillustrated stations. As seen at 6, each router 3 supports "n" priority classes of service (n being an integer greater than 1) wherein class 1 is the lowest priority class ("best efforts" handling) and class n is the highest priority class (best guaranteed time of delivery per packet). The specific value of n is not considered relevant to our invention.

The purpose of the invention is to provide each router with a Quality of Service (QoS) system/mechanism router that will ensure with varying degrees of certainty that service guarantees associated with priorities greater than 1 are consistently met. With this invention, the degree of certainty increases progressively for services having progressively increasing priorities. The mechanism is designed specifically to ensure that guarantees associated with service priorities accorded to transmissions requiring isochronous handling are consistently met.

Each router contains programmable digital data processors of a standard form, and it should be understood that the subject system/mechanism can be implemented either as (new) application software executable by these processors or by means of special hardware augmenting these processors.

2. The QoS System

Figure 2:
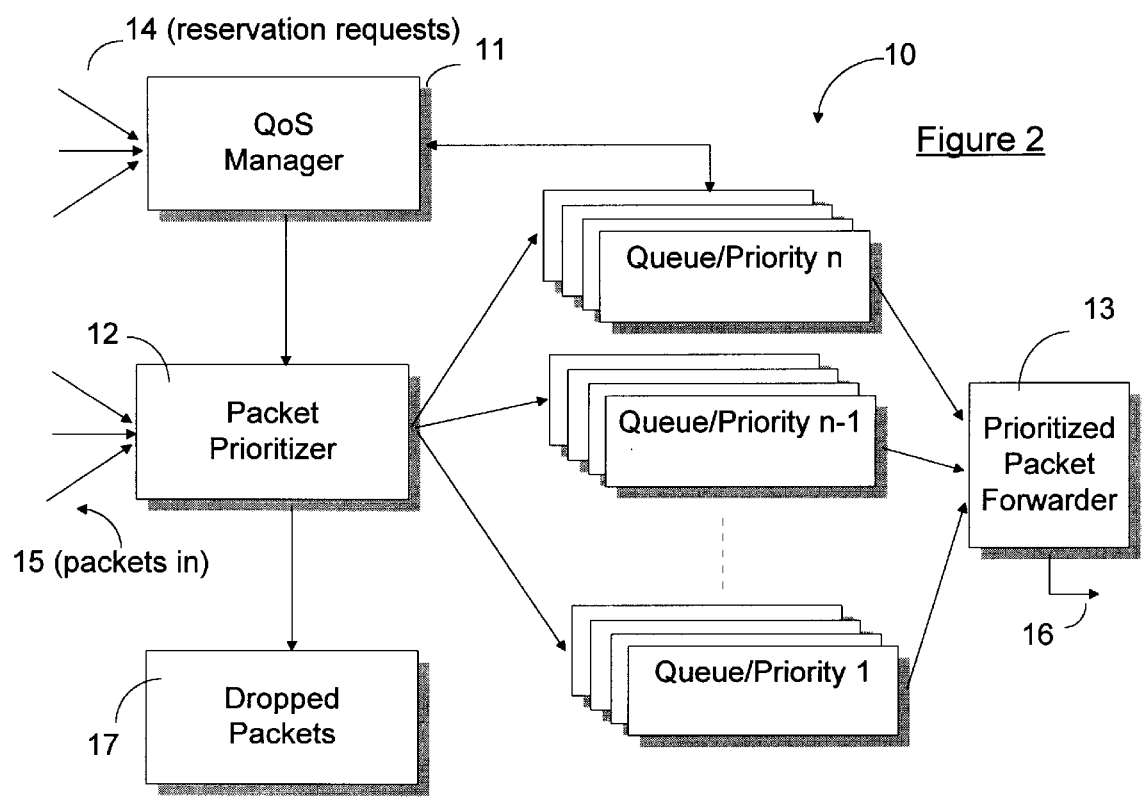
FIG. 2 is a block diagram of the subject QoS mechanism.

FIG. 2 is a block diagram of the QoS mechanism. As shown here, the mechanism contains as principal elements or components: arrays of forwarding queues 10, a QoS manager element 11, a packet prioritizer element 12 and a prioritized packet forwarder element 13.

QoS manager 11 controls assignment of incoming traffic 14 to priority classes, sets initial rates of dummy traffic (which may be varied iteratively as the station's history of traffic becomes known), monitors forwarding delays of traffic in the queues as indications of congestion (even when the congestion may be due to network conditions external to the respective router), uses forms of filler traffic explained later to keep uncongested queues optimally occupied while allowing for detected states of congestion in the queues to be efficiently counteracted, and restricts admission of new traffic when necessary to compensate for detected critical states of congestion.

While queues are operating in other than a critical state of congestion described later, packet prioritizer 12 routes incoming packet traffic 15 (other than incoming dummy traffic which is immediately discarded) into forwarding queues 10 suited to priority levels if any reserved to respective traffic flows. However, the invention tries to maintain constant "optimal" occupancy at each priority level by iteratively promoting traffic from lower priority queues to higher priority queues while the latter are operating below a threshold of congestion described later.

States of approaching/imminent congestion and criticall congestion are detected by monitoring the forwarding delay in each queue in a manner described below. When a state of approaching congestion is detected in a queue, traffic is demoted from the respective queue to lower priority queues in order to relieve the congestion in the respective queue and thereby ensure that incoming new traffic with a service reservation for the respective queue is not unnecessarily blocked from being serviced. While a queue is in a state of critical congestion admission of new traffic flows into the queue is suspended until the state of critical congestion ends.

Forwarding element 13 forwards packets from the queues and dummy packets associated with individual queues to output transmission interfaces 16 of the router.

3. Form of Dummy Packets

Figure 3:
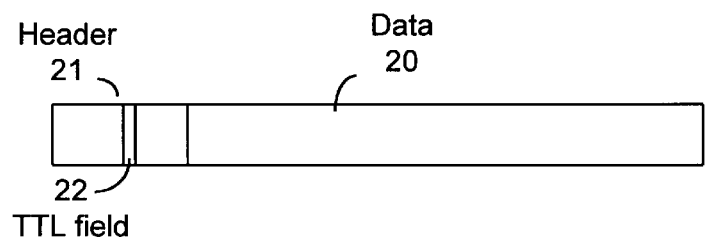
FIG. 3 indicates how dummy packets (packets void of significant data) are differentiated from other packets (packets containing significant data).

FIG. 3 shows how dummy packets are differentiated from other traffic. All packets are assumed to have a data portion 20 and header portion 21, the latter containing characters defining controlling functions required in the handling of the respective packet. In this figure, it is assumed that data packets are sent in the TCP/IP (Transmission Control Protocol/Internet Protocol) format used on the Internet. In that protocol, the header contains a "Time to Live" field 22. In accordance with the present invention, this field is set to 0 in transmitted dummy packets so that such packets are immediately discarded at routers and other stations receiving them. It should be understood, however, that dummy packets could be sent in any format containing a header or control field settable to a value causing respective packets to be discarded on reception.

4. Operations of the QoS Mechanism

Remaining figures of drawing (FIGS. 4 and higher) are used to explain operations of the subject mechanism.

Figure 4:
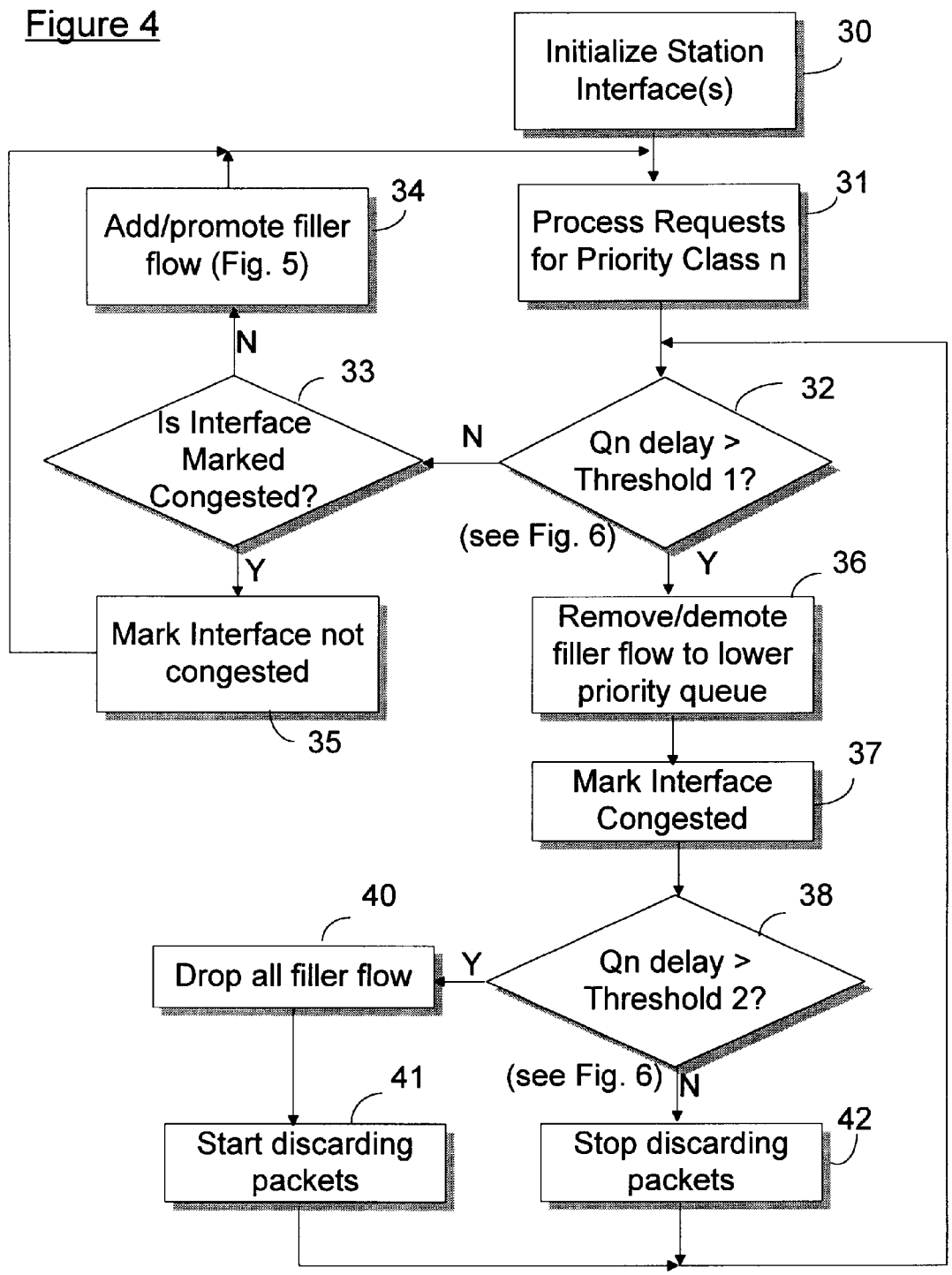
FIG. 4 is a flow diagram for explaining operations of the subject mechanism, relative to a priority queue associated with highest priority handling, in a generalized context.
Figure 5:
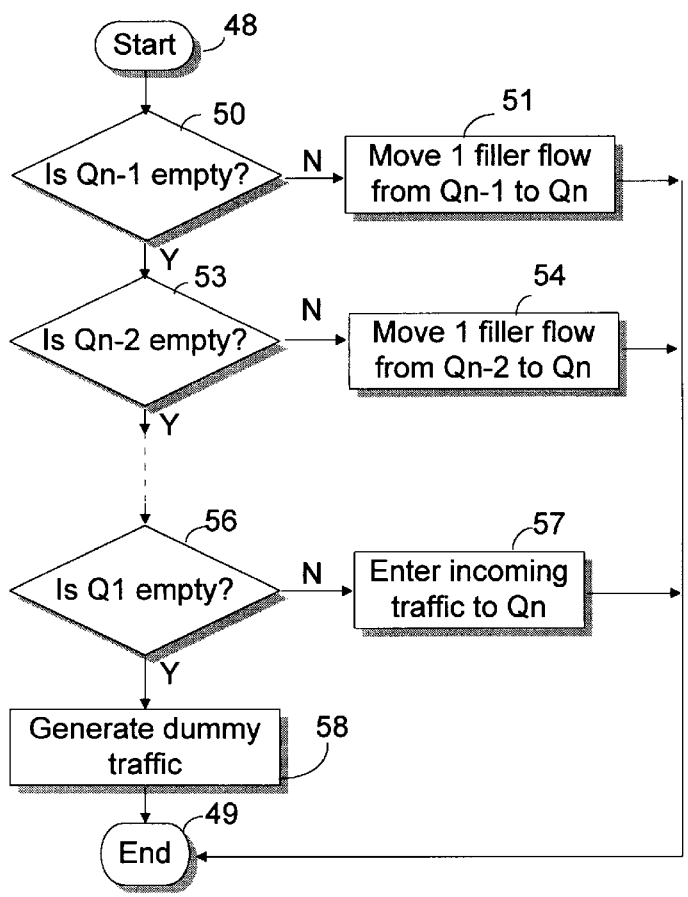
FIG. 5 is a flow diagram for explaining details of a "filler insertion" process suggested in a generalized context in FIG. 4.
Figure 6:
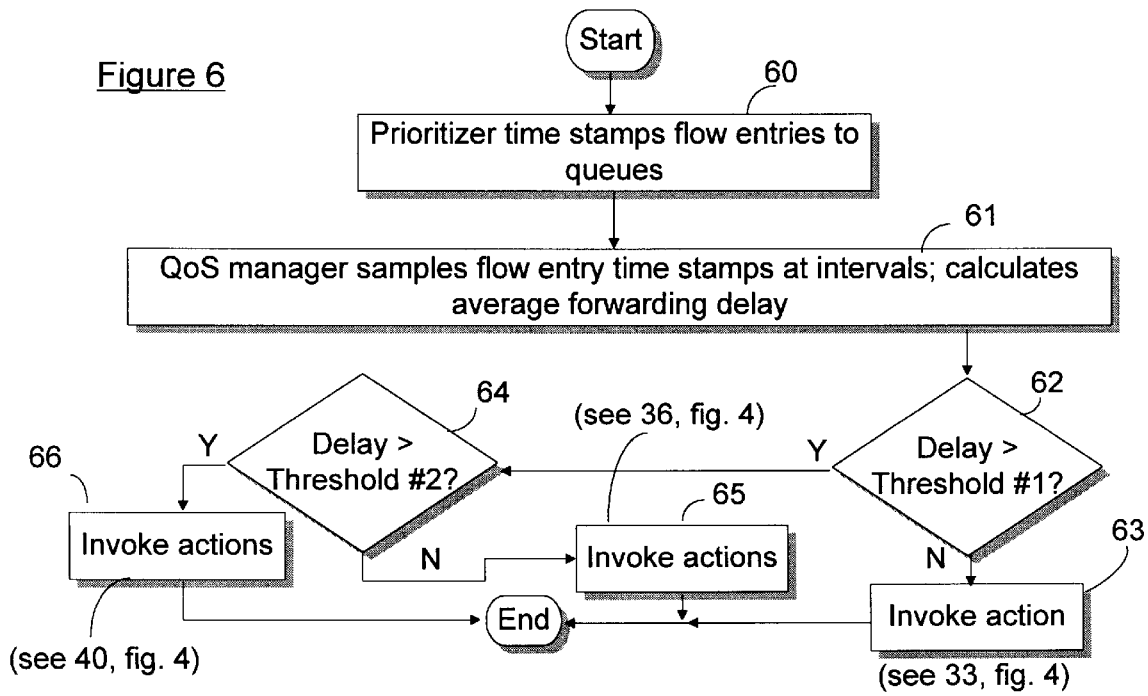
FIG. 6 is a flowchart for explaining how forwarding delays in present queues are monitored as indications of congestion which may be caused by network conditions external to present routers.

FIG. 4 is a flowchart for explaining operations performed relative to queues 10 having highest priority n, such queues hereafter being denoted as "Qn", FIG. 5 is a flowchart for explaining details of an "add filler" operation shown in general form in FIG. 4, and FIG. 6 is a flowchart for explaining how congestion conditions are detected in queues such as Qn and how various controlling actions are evoked to specifically counteract such conditions (even when the cause of the condition is external to the respective router).

Referring to FIG. 4, router interfaces for incoming and outgoing data must be initialized (operation 30) before requests for reservations of service in highest priority class n can be processed. Interfaces are initialized when the router is first powered on or re-started. Logic at each interface is reset and link layer protocols establish communication with neighboring routers connected to the interfaces. When the interfaces are ready the router notifies its neighbors and the network topology is modified to include this router in tables that are used to compute routes for forwarding packets through the network.

When an application in a host terminal of the network determines that it needs a class of service at a particular priority level for a particular flow of packets (a stream of packets having a common origin and destination), a reservation protocol such as RSVP is used. A request for the required class of service is sent to each router along a defined path between the destination and source of the projected flow. Requests for these reservations, contained in special message packets conforming to the reservation protocol, are processed by QoS managers such as 11 (FIG. 2). Block 31 in FIG. 4 represents the processing of such requests directed specifically to services at priority class n. In this transaction, the reservation message requests to have a flow of one or more packets forwarded through the router at priority level n. If the request is accepted, the respective flow of packets is directed through Qn with preferential treatment relative to other packets in the same queue that are entitled to lesser priority handling as explained below.

Such prioritized packet flows—which may, for example, contain real-time audio or video data streams—are characterized in terms of their size (number of packets) and an average or peak rate of arrival of its packets. When the requesting application has negotiated a set of reservations to meet its needs, it starts one or more flows of packets through the route pre-negotiated, and routers at each stage of the route are obliged to handle the packets with appropriate priority (e.g. flows reserved to class n must be forwarded with highest priority through Qn.

It should be understood that flows of incoming real (non-dummy) data packets are subject to default handling at lowest priority level 1 ("best efforts") if a reservation is not made in advance for having them handled at a higher priority level.

For reservation requests that are granted, all subsequent associated packets received at the station are handled in accordance with the priority stipulated in respective reservation requests. Thus, received packets associated with a previously granted priority n request are scheduled to be placed directly on Qn, and received packets entitled to lesser priority service are placed initially on queues having priority lower than n.

A difficulty with such reservation schemes in prior systems was that the router generally had no way to know if it could afford to accept another reservation. This is because, as noted in the Summary of Invention section, the inflection of the hockey stick curves shown presently in FIGS. 7 and 8 need not occur as a consequence of conditions purely local to the router. Rather, the onset of congestion depends on both local conditions and conditions elsewhere in the network. While one could imagine global management schemes to oversee such conditions, we believe that global schemes would be very complex and potentially unstable. Therefore, in this invention we employ a purely local mechanism to provide a reserve of capacity that can be applied in case increasing priority traffic leads to approaching congestion, and to provide additional regulating actions tending to counter-act real congestion. This reserve is normally consumed by the filler traffic including dummy packets, but is quickly recoverable by discarding the filler traffic.

Figure 7:
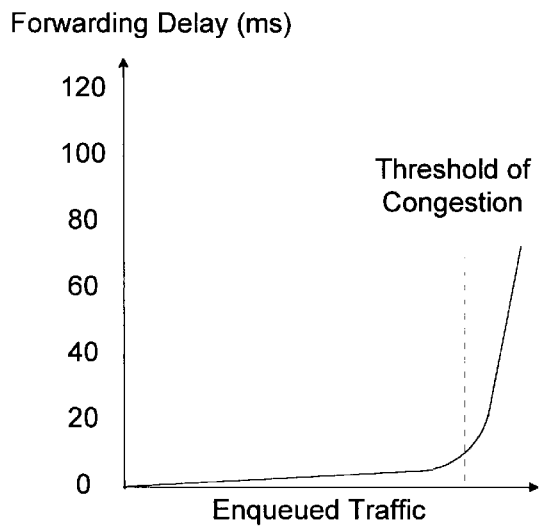
FIG. 7 is a graph for explaining how forwarding delays in present queues tend to vary non-linearly as traffic flow into respective queues approaches a threshold level.

In the present reservation process (31), QoS manager 11 determines (operation 32) if average forwarding delays currently incurred by packets in transit through Qn are greater than a predetermined first threshold level 1. This is achieved by QoS manager operations described below relative to FIG. 6. Briefly, these operations sample time stamps inserted into accepted flow reservations admitted to Qn (the time stamps may be applied by packet prioritizer 12 in the course of handling its responsibilities). The sampling is at predetermined intervals. Periodically, say five times per second, the QoS manager scans time stamps in the queue, and subtracts them from the current actual time to calculate associated forwarding delays which are averaged to obtain an indication of current average forwarding delay in the respective queue (in FIG. 4, Qn). This average delay is compared to a definable threshold level 1. In FIG. 7, for instance, this threshold level 1 is approximately 10 milliseconds (in actual practice, the curve shape could yield a threshold between 10 and 30 milliseconds), which for the illustrated graph represents approximately the upper bound for the linear part of the delay curve and thus represents the possible onset of rapidly approaching congestion since the delay could could quickly rise to perhaps hundreds of milliseconds if the queue contents are not forwarded at a suitable rate.

If the average forwarding delay monitored in this fashion exceeds a second threshold level 2 greater than threshold level 1 (approximately 80 to 100 milliseconds for the curve shown in FIG. 7), it may be understood that the interface to the respective priority level is nearing a critical state of congestion.

Returning to consideration of FIG. 4, if decision 32 indicates an average forwarding delay in Qn less than first threshold level 1, the QoS manager determines next (decision 33) if the interface has been marked congested. The interface will have been so marked if on a previous execution of this process the average forwarding delay had been found to exceed threshold 1.

If the interface has not been marked congested ("N/no" determination at step 33), an additional unit of packet flow if available can be moved/promoted to Qn from a lower priority queue by means of the process indicated generally at 34 and explained in detail later with reference to FIG. 5. This additional traffic from lower priority queues is termed "filler" flow since its purpose while in Qn is to keep that queue filled to an efficient level.

The unit of filer flow for the (promotional) movement associated with block 34 is a flow reservation currently held in a next lower priority non-empty queue (Qn–1 if it is not empty, Qn–2 if it is not empty and Qn–1 is empty, and so on).

If the interface is found to have been marked congested at decision stage 33, it's marking is reversed to indicate a non-congested state (operation 35).

After either operation 34 or operation 35, processing of requests for priority service (operation 31) resumes If the average forwarding delay examined at decision stage 32 is greater than threshold 1 ("Y/yes" determination at 32), the QoS manager moves a unit of filler flow from Qn to Qn–1 (operation 36) and marks the class n interface congested (operation 37). Here again the unit of filler flow is a flow reservation for a class of service lower than n. The filler flow moved to Qn−1 is effectively demoted to lesser priority handling as a result of this action, and the effect is to potentially make room in Qn for admission of additional traffic entitled to class n service at a reception interface of this router (i.e. the effect is to potentially lessen congestion at the class n interface).

After these operations, the QoS manager determines (decision 38) if the average forwarding delay currently exceeds threshold level 2, which is considerably greater than threshold 1 and is associatable with a state of actual congestion in Qn. If the delay exceeds threshold 2 (Y determination at 38), all filler flow in Qn is dropped (operation 40) and the packet prioritizer (element 12, FIG. 2) begins discarding incoming packets having reservations for class n handling (operation 41). Discarded packets are saved (as suggested at 17, FIG. 2) but not entered into the forwarding queue. Accordingly, this tends to degrade handling of incoming packets entitled to class n service for the (usually brief) duration of the congested condition.

If the average delay is not greater than threshold 2 at decision 38 (decision N), the QoS manager acts to halt any discarding of incoming packets (operation 42) which may have been started previously; e.g. in a prior execution of the foregoing process and operation 41.

Details of the process performed to add/promote filler flow to Qn from a lower priority queue (operations 34, FIG. 4) are shown in FIG. 5. In FIG. 5, start and end terminators 48 and 49 respectively represent the entry to and exit from block 34 in FIG. 4.

This process starts with an examination of the state of Qn−1 (decision 50). If Qn−1 is not empty—i.e. if there is at least one traffic flow reservation at priority n−1—a flow reservation is moved from Qn−1 to Qn (operation 51). If Qn−1 is empty at step 50, the state of Qn−2, is examined (step 53). If Qn−2 is not empty, a flow reservation is moved from it to Qn (operation 34). As suggested by dotted lines from step 52 downward, if Qn−2 is empty this process continues through lesser priority queues in succession, down eventually to the lowest priority queue Q1, allowing for promotion of a traffic flow from the non-empty queue closest in priority rank to Qn.

If all lesser priority queues are empty when determinations 50, 53, ..., 56 are made, dummy traffic associated with Qn is generated (operation 58) to correspond roughly to the traffic of a unit of flow reservation at the lowest priority level. This dummy traffic can be entered into Qn as filler traffic. As noted earlier, the amount of dummy traffic so generated at each queue is limited to a predetermined fraction of estimated peak traffic through the queue, and the limit can be changed iteratively as the router is used. The router can determine an appropriate volume for such traffic by randomly picking a flow reservation at priority level 1 and using its parameters. Dummy traffic consists of conventional size packets that are identified as dummy traffic by having their Time To Live fields set to zero (see FIG. 3). Consequently, dummy packets generated in this router are immediately discarded by routers to which they are sent.

The above processes of FIGS. 4 and 5 relative to Qn are applied successively to each lower priority queue (Qn−1, Qn−2, etc.); i.e. traffic in each lower priority queue is regulated by promotion of filler and dummy traffic, until the queue reaches its threshold of congestion, demotion of filler traffic when the queue passes that threshold, and further actions when the queue reaches the critical congestion state associated with threshold level 2. Consequeuently, each queue on the average should carry a maximum load of real, filler and dummy traffic keeping the queue operating near its threshold of congestion.

At each queue, action is taken to counteract states of near and critical congestion. While average forwarding delays are between threshold 1 (the "threshold of congestion") and threshold 2 (the threshold of "critical congestion") filler flows are demoted to lower priority queues, and while average forwarding delays are greater than threshold 2, forward handling of filler traffic and admittance of new incoming traffic are suspended.

FIG. 6 shows details of how functions 38 and 40–42 in FIG. 4 are accomplished. The packet prioritizer inserts time stamps into units of class n flow that are placed in Qn as well as units of class i flow (i<n) placed in respective queues Qi (operation 60). The QoS manager periodically samples these stamps, subtracts the samples from current actual time and averages the results to yield the average forwarding delay in each queue. If the average forwarding delay is less than threshold level 1 (N determination at decision 62) action 63 is evoked corresponding to action 33 in FIG. 4. If the average forwarding delay is greater than threshold 1 but less than full congestion threshold 2 (Y determination at 62 and N determination at 64) action 65 (corresponding to action 36 in FIG. 4) is evoked. If average forwarding delay is greater than threshold 2 (Y determinations at both 62 and 64) action 66 (corresponding to action 40, FIG. 4) is evoked.

Figure 8:
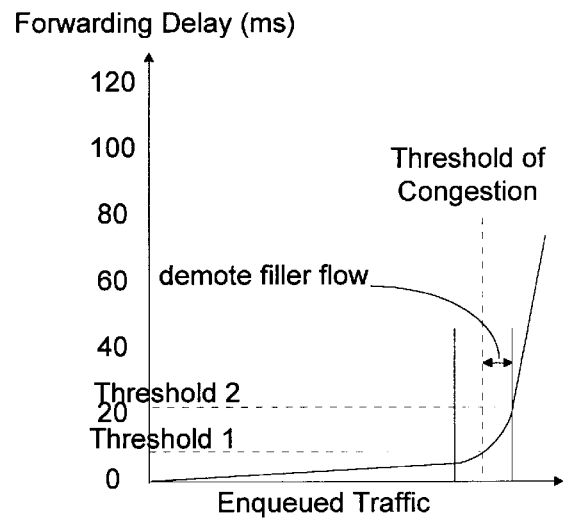
FIG. 8 is a graph similar to FIG. 6 for indicating how the manipulations of filler traffic characterized in FIGS. 4 and 5 serves as a ballast or buffer enabling the present control mechanism to efficiently control traffic flow into present queues.

FIG. 8 is a graph with hockey stick shaped curve, similar to the graph in FIG. 7, but indicating further how threshold levels 1 and 2 are reasonably determinable. The line designated "Threshold of Congestion" in both FIGS. 7 and 8 represents an approximate middle position in the bend between the flat, linear and slowly rising part of the curve and the non-linear fast-rising part of the curve. This position then can be treated as a threshold 1 of "non-critical" congestion, and a line drawn through the steep end of the bend can be used to define a threshold 2 of critical congestion.

Figure 9:
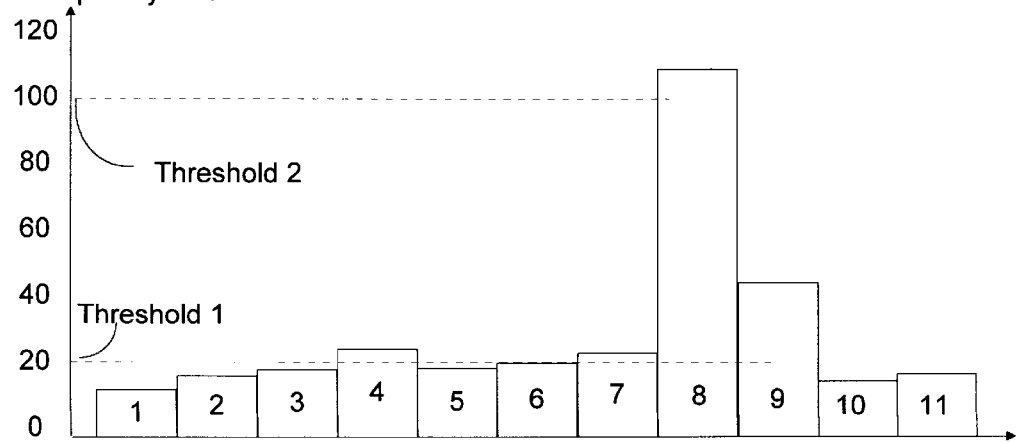
FIG. 9 is a time-based graph for explaining how the present invention deals with various stages of congestion in the queues.

FIG. 9 shows how this invention deals with various stages of congestion in any queue. Starting from an initial low level of filler traffic in the queue (time interval 1), the QoS manager accepts flow reservations for this queue. This increases the volume of traffic through the queue over successive intervals of time (intervals 2 and 3), and the average forwarding delay begins to rise. In interval 4, the average forwarding delay exceeds threshold level 1 causing the QoS manager to demote filler traffic out of the queue. This causes the average forwarding delay to fall and eventually drop below threshold 1, whereupon the promotion of filler traffic up to the queue resumes (intervals 5 through 7).

During interval 8, some significant perturbation of the network causes a rapid increase in average forwarding delay in this queue to above threshold level 2 associated with critical congestion. The QoS process now suspends forwarding of filler traffic out of the queue and starts to discard new incoming packet flows that would normally flow into this queue. This leads to a reduction in average forwarding delay. The interface may remain congested, but the process stops discarding packets (interval 9). Finally, in interval 10, the interface is no longer congested (average forwarding delay has fallen below threshold level 1) and the process begins to promote filler traffic again to the respective queue.

What is claimed is:

1. For a data transmission network having packet routers offering guaranteed priority services consistent with isochronous handling of data flows representing real time voice data, a packet router control system for ensuring that guarantees associated with said services can be consistently met with a high degree of certainty even when forwarding queues in the controlled router become congested due to conditions external to that router, said control system comprising:

first and second packet forwarding queues having respective first and second forwarding priorities, the first priority greater than the second priority;

a prioritizer element for transferring incoming packets that are parts of units of packet flow directly into said first and second queues, packets in each said unit of flow having common origin and destination; said prioritizer element transferring incoming packets that are part of a packet flow having a reservation for said guaranteed priority service into said first queue and other packets directly into said second queue;

a monitoring element for monitoring said first queue to detect first and second states of respective imminent and critical congestion in said first queue; and a flow regulating element interacting with said monitoring and prioritizer elements for regulating the flow of packets into and out of said first queue when necessary to compensate for conditions in said network causing said first and second states; said flow regulating element acting, while said first queue is in neither of said first and second states, to promotionally transfer units of filler packet flow from said second queue to said first queue; said regulating element acting, while said first queue is in said first state, to demotionally transfer said promotionally transferred units of filler packet flow from said first queue to said second queue; and said regulating element acting, while said first queue is in said second state, to block admission of new packet flows to said first queue and also to block forwarding transfers, from said first queue to said network, of any filler packet flows currently occupying said first queue.

2. The system of claim 1 wherein said flow regulating element further includes means to insert dummy packets of predetermined form into said first queue while said first queue is in neither of said first and second states and said second queue is empty; said dummy packets having a form causing them to be immediately discarded at network stations to which they are sent; the rate of insertion of said dummy packets being restricted to keep the peak dummy packet traffic through said first queue at a predetermined fraction of the expected peak rate of real traffic through that queue.

3. The system of claim 1 wherein said network is a public network such as the Internet, said packets are in the TCP/IP format used in the Internet, said format having a control header including a Time to Live field, and said dummy packets exclusively having their Time to Live fields set to 0, that setting causing the dummy packets to be discarded at routers and network stations to which they are sent when they are forwarded out of said controlled router.

4. The system of claim 1 wherein said monitoring element includes means for periodically sampling time stamps applied to data entering said first queue, means using the sampled times to calculate a latest average packet forwarding delay for said first queue, and means for comparing said latest average forwarding delay to predetermined first and second thresholds associated respectively with transitions to said first and second states of congestion.

5. The system of claim 4 wherein said first and second thresholds used by said comparing means are derived from predetermined first and second positions in the bend of a hockey-stick curve defining the relationship in said first queue between traffic loads and average forwarding delays.

6. For a data transmission network having packet routers offering guaranteed priority service in respect to data needing isochronous handling, a method of regulating traffic flow within said routers so as to ensure that guarantees associated with said service can be consistently met with a high degree of certainty even when forwarding queues in the router become congested due to conditions external to the router, said method comprising:

transferring incoming packets that are parts of units of packet flow directly into first and second queues having different priorities, said first queue having a higher priority than said second queue; said first queue being used to support forwarding of traffic subscribed to said priority service requiring isochronous handling;

monitoring said first queue to detect first, second and third states of occupancy in said first queue; said first state being present when said the average forwarding delay in said first queue is below a first threshold associated with imminent congestion, said second state being present when said average forwarding delay is greater than said first threshold but less than a second threshold associated with onset of critical congestion, and said third state being present when said average forwarding delay is above said second threshold; and regulating flow of packet traffic into and out of said first queue to keep said queue operating efficiently while counteracting said states of imminent and critical congestion.

7. The method of claim 6 wherein said flow regulating steps include:

promotionally transferring filler packet flows from said second queue to said first queue while said first queue is in said first state of neither imminent nor critical congestion;

demotionally transferring filler flows from said first queue to said second queue while said first queue is in said second state of imminent congestion; and blocking admission of new packet flows to said first queue, as well as forwarding transfers of filler packet flows out of said first queue, while said first queue is in said third state of critical congestion.

8. The method of claim 7 wherein said flow regulating step further includes:

inserting dummy filler packets of predetermined form into said first queue while said first queue is in said first state and said second queue is empty; said dummy packets having a form causing them to be immediately discarded at stations of said network receiving them; said dummy packets being entered into said first queue at a restricted rate suitable for not unduly interfering with admission of new real packet flows into said first queue.

9. The method of claim 8 wherein said network is a public network such as the Internet, said packets are in the TCP/IP format used in the Internet, said format having a control header including a Time to Live field, and said dummy packets exclusively having their said Time to Live fields set to 0, that value causing the dummy packets to be discarded at routers to which they are sent.

10. The method of claim 6 wherein said monitoring step includes:

periodically sampling time stamps applied to data entering said first queue, calculating a latest average forwarding delay for said first queue from said sampled time stamps, and comparing said latest average forwarding delay to predetermined first and second thresholds associated respectively with transitions to said second and third states of respective imminent and critical congestion.

11. The method of claim 10 wherein said first and second thresholds used in said comparing step are derived from predetermined first and second positions in the bend of a hockey-stick curve defining the relationship in said first queue between instant packet traffic loads and average forwarding delays.

* * * * *